United States Patent [19]

Lewis et al.

[11] Patent Number: 4,744,974

[45] Date of Patent: May 17, 1988

[54] PROCESS FOR PRODUCTION OF ALUMINA

[75] Inventors: Duane J. Lewis, Ponca City, Okla.; William H. McNeese, Houston, Tex.

[73] Assignee: Vista Chemical Company, Houston, Tex.

[21] Appl. No.: 910,619

[22] Filed: Sep. 23, 1986

[51] Int. Cl.$^4$ ............................................. C01F 7/02
[52] U.S. Cl. ................................... 423/625; 556/181; 556/182
[58] Field of Search ................. 423/625; 556/182, 181

[56] References Cited

U.S. PATENT DOCUMENTS

| | | | |
|---|---|---|---|
| 2,636,865 | 4/1953 | Kimberlin, Jr. et al. | 423/625 |
| 3,318,934 | 5/1967 | Hoffmann et al. | 556/181 |
| 3,450,735 | 6/1969 | Lundeen et al. | 556/181 |
| 3,679,361 | 7/1972 | Bonelli | 423/625 |

FOREIGN PATENT DOCUMENTS 252515  5/1961  Australia ............................ 423/630

OTHER PUBLICATIONS

Chemical Engineers Handbook, Perry, pp. 132–134, 1973, McGraw Hill.

*Primary Examiner*—Patrick P. Garvin
*Assistant Examiner*—Paige C. Harvey
*Attorney, Agent, or Firm*—Browning, Bushman, Zamecki & Anderson

[57] ABSTRACT

A process for producing alumina wherein an aluminum trialkyl is reacted with a substantially water immiscible alcohol to produce an aluminum alkoxide and an alkane, the reaction between the aluminum trialkyl and the alcohol being conducted in an organic phase, the alkoxide being hydrolyzed in an aqueous phase which is in contact with the organic phase, the alumina formed by hydrolysis of the aluminum alkoxide being recovered from the aqueous phase.

7 Claims, 1 Drawing Sheet

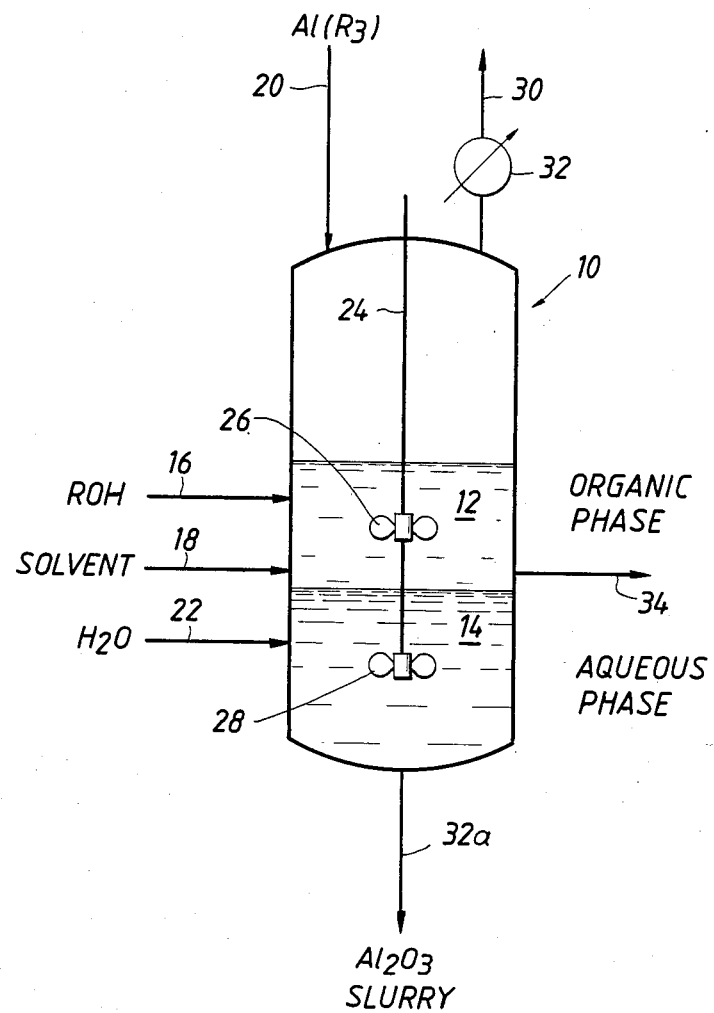

4,744,974

PROCESS FOR PRODUCTION OF ALUMINA

BACKGROUND OF THE INVENTION

The present invention relates to the production of alumina and, more particularly, to the production of an alumina of high purity.

Currently, a widely used processes for the production of alumina involves reacting aluminum or an aluminum bearing material with an olefin such as ethylene to produce a trialkyl aluminum. The trialkyl aluminum is distilled to remove impurities, and the purified triethyl aluminum reacted with an alpha olefin such as ethylene to produce what is known as an aluminum alkyl growth product, the chain length of the alkyl groups depending upon the degree of reaction between the olefin and the trialkyl aluminum. Subsequently, the aluminum alkyl growth products are subjected to a two-stage oxidation. In the first stage, the aluminum alkyls are oxidized approximatey 40% to aluminum alkoxides. In the second stage, the oxidation of the aluminum alkyl growth product is carried to completion, the second stage normally being carried out in the presence of a titanium compound such as a titanium halide to suppress side reactions and increase the yield of the aluminum alkoxides. The aluminum alkoxides (oxidized growth product) from the oxidation are then hydrolyzed with water to produce alumina and alcohols. The reaction is normally carried out in a large excess of water so that an aqueous slurry containing roughly 12% by weight alumina is formed. The alcohols, which generally are of a relatively long chain, form a separate phase and are removed by decanting from the bulk phase and then steam stripping the aqueous slurry containing the alumina to remove the residual, dissolved alcohols. The alumina is recovered by drying the slurry in a spray dryer.

In the above-described process process for the production of alumina, there are several stages in the process at which impurities or by-products can be introduced or formed and which end up in the alumina end product. For example, an obvious source of contamination of alumina is the titanium which is added to suppress side reactions in the second stage of the oxidation reaction of the aluminum alkyls growth product. It is common for alumina produced according to the above-described process to have a titanium content (as $TiO_2$) of from about 1600 to about 1900 ppm. Such high contents of titanium can alter the electrical and optical properties of the alumina making it unsuitable for forming into high technology items which require extremely pure alumina.

SUMMARY OF THE INVENTION

It is therefore an object of the present invention to provide an improved process for the production of alumina.

Another object of the present invention is to provide a process for the production of alumina which has a low titanium content.

Yet a further object of the present invention is to provide a process for the production of alumina in which the oxidation of the aluminum alkyls to aluminum alkoxides and the hydrolysis of the resulting alkoxides is conducted in a single reaction zone.

The above and other objects of the present invention will become apparent from the drawings, the description given herein and the appended claims.

In the process of the present invention, an aluminum trialkyl is reacted with a substantially water immiscible alcohol in an organic phase to produce the aluminum alkoxide and liberate an alkane corresponding to the alkyl group(s) of the aluminum trialkyl. The aluminum alkoxide is then hydrolyzed in an aqueous phase to produce the alcohol and alumina which is recovered and dried. In the process, the reaction between the aluminum trialkyl and the alcohol to form the alkoxide and the hydrolysis of the alkoxide are conducted in a common reaction zone, the organic phase being contiguous the aqueous phase in the common reaction zone.

BRIEF DESCRIPTION OF THE DRAWING

The invention will be better understood with reference to the drawing in which the single FIGURE is a schematic representation of a reactor for conducting the preferred mode of operation of the process of the present invention.

DETAILED DESCRIPTION OF THE PREFERRED EMBODIMENT

The aluminum trialkyls utilized in the process of the present invention can be produced, in the well known manner, by reacting an olefin with an aluminum bearing material. As used herein, the term "aluminum bearing material" is intended to include pure aluminum as well as aluminum alloys and mixed alloy scrap. The alkyl groups of the aluminum trialkyl compounds can contain from 2 to 20 carbon atoms, and indeed the carbon length can be greater if desired. However, preferably the alkyl group of the aluminum trialkyls will contain from about 2 to about 4 carbon atoms. Thus, the aluminum trialkyl can be aluminum triethyl, aluminum tripropyl, etc. or it can be an aluminum trialkyl growth product, made as described above, wherein the alkyl group is of a considerable length having 20 or more carbon atoms.

The alcohol used in the process of the present invention can be any substantially water immiscible alcohol which will react with the aluminum trialkyl under hydrolysis conditions to produce aluminum alkoxide and release the alkane(s) corresponding to the alkyl groups of the aluminum trialkyl. The term "non-miscible" means an alcohol which, unlike ethanol, methanol or the like, is not miscible in all proportions with water, albeit that it may have some solubility in water. Thus, any alcohol having greater than about 4 carbon atoms can be used. Preferably, the alcohols employed will have from about 4 to about 12 carbon atoms and be aliphatic alcohols such as butanol, isobutanol, pentanol, hexanol, etc.

In carrying out the process of the present invention, the aluminum trialkyl and the alcohol are reacted in an organic phase. The liquid which makes up the organic phase can be any organic liquid which is not appreciably water soluble, which is inert, i.e. is non-reactive with the aluminum trialkyl or the alcohol under the reaction conditions of the process, and in which the aluminum trialkyl and alcohol are soluble. Suitable organic liquids forming the organic phase include liquid hydrocarbons, such as alkanes, both branched and straight chain, aromatics, etc. Non-limiting examples of suitable liquid hydrocarbons for use in the process of the present invention include hexane, heptane, octane, decane, kerosene, benzene, toluene, etc. Alternatively, the organic phase can be formed by the alcohol which is reacted with the aluminum trialkyl. The organic solvent will be one which is generally or substantially insoluble in water.

In the process of the present invention, the aluminum trialkyl and the alcohol in the organic phase or solvent are reacted to form the aluminum alkoxide and the alkane. The organic phase in which the reaction between the aluminum trialkyl and the alcohol occurs is in contact with a water or aqueous phase, i.e. the reaction is conducted in a two-liquid phase medium. As the aluminum trialkyl reacts with the alcohol to produce aluminum alkoxide and alkane, the aluminum alkoxide, migrates from the upper, organic phase into the lower, aqueous phase where it reacts with the water to hydrolyze and form alumina and the alcohol which, having limited solubility in the water, once again returns to the organic phase. Thus, both the reaction between the aluminum trialkyl and alcohol and hydrolysis of the alkoxide can be said to be conducted in a single reaction zone or reactor.

The aluminum trialkyl concentration of the organic phase can vary widely, ranging from about 0.1 to about 15% by weight or greater. The alcohol content of the organic phase will be determined by the amount of aluminum trialkyl present; however, generally there will be an excess of alcohol present, especially in cases where the alcohol is used as the solvent.

The ratio of the weight of the organic phase to the aqueous phase can range from about 1 to about 10 to about 10 to 1. Generally, there will be sufficient aqueous phase present to ensure a slurry of alumina containing about 5 to 20% by weight alumina.

The process of the present invention can be carried out in either a batch or continuous mode. Temperatures and pressures employed in the process may vary widely. Since the reaction between the aluminum trialkyl and the alcohol to form the aluminum alkoxide is generally exothermic, it is usually not necessary to supply heat to the reaction and, indeed, it may be necessary, depending upon the particular reactants and the amounts thereof, to cool the reaction mixture. However, it will be appreciated that if it is desired to carry the reaction out at higher temperatures, the reaction can be conducted under suitable elevated pressures to prevent unwanted vaporization of the solvents or the reactants.

A feature of the present invention is that since the alkoxides are not formed by oxidation of the aluminum trialkyl, but rather by reaction with alcohol, there is no need for addition of a titanium promoter as in the prior art process described above.

Although the process can be carried out in either a batch or continuous manner, for descriptive purpose, the process will be described with reference to a batch process.

Referring now to the drawing, there is shown a reactor 10 containing an organic phase 12 and an aqueous phase 14, the aqueous phase 14 forming the lower phase and being in direct contact or contiguous organic phase 12. Organic phase 12 is comprised of an alcohol introduced into reactor 10 via line 16, an organic liquid, e.g. hexane, introduced into reactor 10 via line 18, and an aluminum trialkyl introduced into reactor 10 via line 20, the aluminum alkyl preferably being introduced in admixture with the same or a compatible solvent introduced into reactor 10 via line 18. The aqueous phase is comprised of water introduced into reactor 10 via line 22. To ensure uniform but gentle agitation of the organic phase and the aqueous phase, vessel 10 is provided with an agitator 24 having a mixing vane 26 for agitating the organic phase and a mixing vane 28 for agitating the aqueous phase. Vessel 10 is also provided with a vent line 30 having a relfux condenser 32.

In conducting the process, the aqueous phase 14, e.g. water, and the organic phase 12, e.g. the organic liquid and reactants, are introduced into reactor 10 so as to form a two-phase, liquid reactor charge. Agitator 24 is operated so as to obtain uniform mixing within each of the layers but prevent intermixing of the organic phase with the aqueous phase. The aluminum trialkyl is then introduced into reactor 10 via line 20, the aluminum trialkyl preferably being introduced in the form of a solution thereof in a solvent (0–95% solvent) which is preferably the same as the solvent forming the organic phase. As the aluminum trialkyl reacts with the alcohol in the organic phase, aluminum alkoxide is formed in the organic phase 12, the reaction being exothermic. The aluminum alkoxide migrates to the organic and aqueous interface where it reacts with the water to form alumina. The alumina, in the form of a slurry, is then removed from reactor 10 via line 32a, the alumina subsequently being recovered from the slurry by means such as spray drying. In a continuous process, as the alumina slurry is removed, make up water is added.

As the reaction between the alcohol and the aluminum trialkyl proceeds, in addition to the aluminum alkoxide being formed, alkane, corresponding to the alkyl groups in the aluminum trialkyl, is also formed in the organic phase. If the aluminum trialkyl is formed of alkyl groups of relatively short carbon chain length, the alkane formed will be low molecular weight alkanes such as ethane, propane, etc. Since the reaction is exothermic and such alkanes are normally gaseous, reflux condenser 32 and vent line 30 allow the reaction to proceed smoothly with the low molecular weight alkane being slowly removed as desired. It will be appreciated that in cases where the alkyl groups of the aluminum alkyl have a relatively long carbon chain length and are not vaporized under the conditions existing in reactor 10, they will become part of the organic phase. Thus, as more aluminum alkyl is reacted, the organic phase will increase in volume. To maintain the organic phase at the desired volume, a portion thereof can be periodically removed from reactor 10 via line 34.

To more fully illustrate the present invention, the following non-limiting example is presented.

EXAMPLE

The apparatus used for carrying out the process consisted of a three-neck flask equipped with an agitator, a reflux condensor and a dropping funnel. Butanol (100 g), distilled water (200 g), and hexane (20 g) were charged to the flask. The flask was heated with stirring until the hexane began to reflux (62° C.). Mixing was kept at a slow enough pace to maintain a separate alcohol/hexane and water phase. A solution of 10% by weight of aluminum triethyl in hexane was slowly dripped into the alcohol/hexane (organic) phase from the dropping funnel (150 g in 37 minutes). The reaction between the aluminun triethyl and butanol to form aluminum alkoxide in the upper, organic phase was very vigorous. The reaction temperature climbed to 75° C. at the start of the reaction and then fell, leveling off at 64° C.–68° C. During the reaction, the upper, organic phase was cloudy while, at the beginning, the lower water phase was clear. Gradually, aluminum alkoxide in the upper phase migrated into the lower aqueous phase where the aluminum alkoxide reacted with the water to form alumina and butanol. When the reaction was complete, the alumina product was filtered, washed with distilled water and refiltered. The alumina filter cake was dried overnight in an oven at 110° C. Half of the dried sample was then calcined for three hours at 482° C. Samples of the dried and calcined aluminas were tested to determine various physical properties. For comparison, a sample of an alumina slurry made by the prior art method described above was also dried and calcined. The results are summarized in the Table below.

|  | Dried Aluminas | | Calcined Aluminas | |
| --- | --- | --- | --- | --- |
|  | Single Reactor | Prior Art | Single Reactor | Prior Art |
| Surface area ($m^2/g$) | 419 | 283 | 297 | 258 |
| Pore Volume (cc/g) (35–10,000Å) | 0.346 | 0.19 | 0.665 | 0.43 |
| Crystal structure | Boehmite | Boehmite | Gamma | Gamma |
| Crystalline size (Å) | | | | |
| (020) | 32 | 36 | — | — |
| (021) | 39 | 63 | — | — |

As can be seen from the data in the Table, there is marked difference in the physical properties of the prior art alumina and the alumina made in accordance with the present invention (single reactor). However, the physical properties of the calcined samples are similar. It is to be noted, however, that the sample made in accordance with the present invention had a larger pore volume, a desirable feature in certain instances, particularly catalysis.

It is also observed that alumina prepared according to the process of the present invention contains markedly less titanium (less than 100 ppm as $TiO_2$) compared to alumina produced by the prior art process which generally has a titanium content of from about 1600–1900 ppm (as $TiO_2$).

The foregoing disclosure and description of the invention is illustrative and explanatory thereof, and various changes in the method steps may be made within the scope of the appended claims without departing from the spirit of the invention.

What is claimed is:

1. A process for the production of alumina, comprising:
    reacting an aluminum trialkyl with a substantially water immiscible alcohol to produce aluminum alkoxide and alkane;
    hydrolyzing said aluminum alkoxide to produce said alcohol and alumina, said reaction between said aluminum trialkyl and said alcohol being conducted in an organic phase, said hydrolysis of said aluminum alkoxide being conducted in an aqueous phase, said organic phase and said aqueous phase being contiguous, said reacting of said aluminum trialkyl with said alcohol and said hydrolyzing being conducted in a single, common reaction zone; and
    recovering said alumina.
2. The process of claim 1 wherein said alcohol comprises an aliphatic alcohol having from about 4 to about 12 carbon atoms.
3. The process of claim 1 wherein said aluminum trialkyl comprises aluminum triethyl.
4. The process of claim 1 wherein said aluminum is recovered by spray drying.
5. The process of claim 1 wherein said organic phase comprises a liquid hydrocarbon.
6. The process of claim 1 carried out in a continuous manner.
7. The process of claim 1 carried out in a batch manner.

* * * * *

UNITED STATES PATENT AND TRADEMARK OFFICE
CERTIFICATE OF CORRECTION

PATENT NO. : 4,744,974
DATED : May 17, 1988
INVENTOR(S) : Duane J. Lewis et al

It is certified that error appears in the above-identified patent and that said Letters Patent is hereby corrected as shown below:

In Column 6, line 30, delete "aluminum" and insert therefor --alumina--.

Signed and Sealed this

Twenty-fifth Day of October, 1988

*Attest:*

DONALD J. QUIGG

*Attesting Officer*  *Commissioner of Patents and Trademarks*